(12) United States Patent
Sasaki et al.

(10) Patent No.: US 7,281,238 B2
(45) Date of Patent: Oct. 9, 2007

(54) METHOD AND PROGRAM FOR MONITORING EXECUTION STATE OF PROGRAM

(75) Inventors: Hidetaka Sasaki, Yokohama (JP); Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 785 days.

(21) Appl. No.: 10/649,698

(22) Filed: Aug. 28, 2003

(65) Prior Publication Data
US 2004/0103395 A1 May 27, 2004

(30) Foreign Application Priority Data
Nov. 26, 2002 (JP) ............... 2002-341657

(51) Int. Cl.
G06F 9/44 (2006.01)
G06F 11/00 (2006.01)

(52) U.S. Cl. ............ 717/127; 717/124; 717/126; 717/128; 717/131; 714/37; 714/38; 714/39

(58) Field of Classification Search ............ 717/124, 717/126–128, 131; 714/25, 30, 37–39, 51, 714/55
See application file for complete search history.

(56) References Cited

U.S. PATENT DOCUMENTS

| | | | |
|---|---|---|---|
| 5,537,595 A * | 7/1996 | Sakata | 718/105 |
| 5,758,189 A | 5/1998 | Nakada et al. | |
| 6,223,201 B1 | 4/2001 | Reznak | |
| 6,360,337 B1 * | 3/2002 | Zak et al. | 714/47 |
| 6,438,551 B1 | 8/2002 | Holmskar | |
| 6,556,952 B1 * | 4/2003 | Magro | 702/183 |
| 2004/0193827 A1 | 9/2004 | Mogi et al. | |

FOREIGN PATENT DOCUMENTS

JP    A-2001-325126    11/2001

* cited by examiner

*Primary Examiner*—William H. Wood
(74) *Attorney, Agent, or Firm*—Mattingly, Stanger, Malur & Brundidge, P.C.

(57) ABSTRACT

Item values associated with an execution state of a program executed on a computer are collected in detail while suppressing the computer load. When reducing the interval for collecting values of one item to be monitored, the interval for collecting values of items other than that item is increased. If the computer load is increased, an interval of at least one item is increased. Moreover, there is provided an upper limit for the number of items whose intervals can be reduced simultaneously. Moreover, when varying the interval of the item according to the values of the respective items, the interval variation range is varied according to the item state and the computer load.

11 Claims, 18 Drawing Sheets

| ITEM NAME | COLLECTION INTERVAL | INITIAL VALUE | COLLECTION STATE | VARIATION REFERENCE VALUE | MINIMUM VALUE | MAXIMUM VALUE |
|---|---|---|---|---|---|---|
| AP1 ACCESS FREQUENCY | 30s | 50s | DETAIL | 4 | 10s | 100s |
| AP2 WAIT TIME | | | | | | |
| | | | | | | |

| ITEM NAME | NORMAL STATE DEFINITION | ITEM STATE | PREVIOUSLY ACQUIRED ITEM VALUE |
|---|---|---|---|
| AP1 ACCESS FREQUENCY | 20/S OR BELOW | NORMAL | 5/s |
| AP2 WAIT TIME | 120S OR BELOW | ABNORMAL | 140s |
| | | | |

| ITEM NAME | NORMAL STATE DEFINITION | ITEM STATE | COLLECTION INTERVAL | PREVIOUSLY ACQUIRED ITEM VALUE |
|---|---|---|---|---|
| 400 | 410 | 420 | 430 | 440 |
| COMPUTER 1 CPU USE RATIO | 70% OR BELOW | ABNORMAL | 30s | 80% |
| COMPUTER 1 DISC EMPTY CAPACITY | 10% OR ABOVE | NORMAL | 100s | 70% |
|  |  |  |  |  |

| ABNORMAL ITEM NAME | DERIVATIVE GROUP | GROUP NAME |
|---|---|---|
| 500 | 510 | 520 |
| AP1 WAIT TIME | AP1 WAIT TIME, AP2 ACCESS FREQUENCY... | G1 |
| AP2 WAIT TIME | AP2 WAIT TIME, AP3 ACCESS FREQUENCY... | G2 |
|  |  |  |

FIG.6

| DERIVATIVE ITEM NAME | ABNORMAL ITEM NAME |
|---|---|
| AP2 ACCESS FREQUENCY | AP1 WAIT TIME |

| DERIVATIVE GROUP | DETAIL COLLECTION TIME | REFERENCE TIME |
|---|---|---|
| G1 | 30s | 10s |
| 2100 | 2200 | 2300 |

METHOD AND PROGRAM FOR MONITORING EXECUTION STATE OF PROGRAM

BACKGROUND OF THE INVENTION

The present invention relates to a technique for monitoring execution state of a program executed on a computer.

JP-A-2001-325126 discloses a method for monitoring a computer system having a computer or the like by collecting values of items associated with the execution state of a program executed on the computer at a predetermined time interval, wherein according to the use frequency or load of the computer, the computer monitoring interval is reduced or the number of items (monitoring items) to be monitored is added or alternatively, the computer monitoring interval is increased or the monitoring item is deleted.

SUMMARY OF THE INVENTION

When monitoring the execution state of a program executed on a computer and use state of the hardware resources of the computer, it is preferable to collect values of items associated with the execution state of the program to be monitored at a short time interval so as to obtain detail information on the object to be monitored. On the other hand, in order to obtain values of items associated with the program execution state, it is necessary to execute a monitoring program on the computer and collection of items to be monitored at a short time interval increases the load on the computer. It is necessary to collect detail information on the object to be monitored while suppressing the load on the computer. This is not described in the prior art.

It is therefore an object of the present invention to provide a technique for obtaining detail information on an object to be monitored while controlling the collection time interval of each item so as to suppress the computer load.

In order to achieve the aforementioned object, the present invention suggests the following means. That is, when a collection time interval of a certain item is decreased, the collection time intervals of the other items are increased. Moreover, when the load on a computer has become high, a collection time interval of a certain item is increased. Simultaneously with this, there is provided an upper limit for the number of items whose collection time interval can be decreased. Moreover, when a time interval of an item is varied according to the item value, the interval varying range is varied according to the item state and the computer load.

Other objects, features and advantages of the invention will become apparent from the following description of the embodiments of the invention taken in conjunction with the accompanying drawings.

BRIEF DESCRIPTION OF THE DRAWINGS

FIG. 2 shows a table associated with the collection time interval.

FIG. 3 shows a table associated with item states.

FIG. 4 shows a table associated with the computer load.

FIG. 5 shows a table associated with derivative group.

FIG. 6 shows a table associated with abnormal items.

FIG. 20 is table having information on detail collection time of each derivative group.

DESCRIPTION OF THE EMBODIMENTS

Description will now be directed to embodiments of the present invention with reference to the attached drawings.

Figure 1:
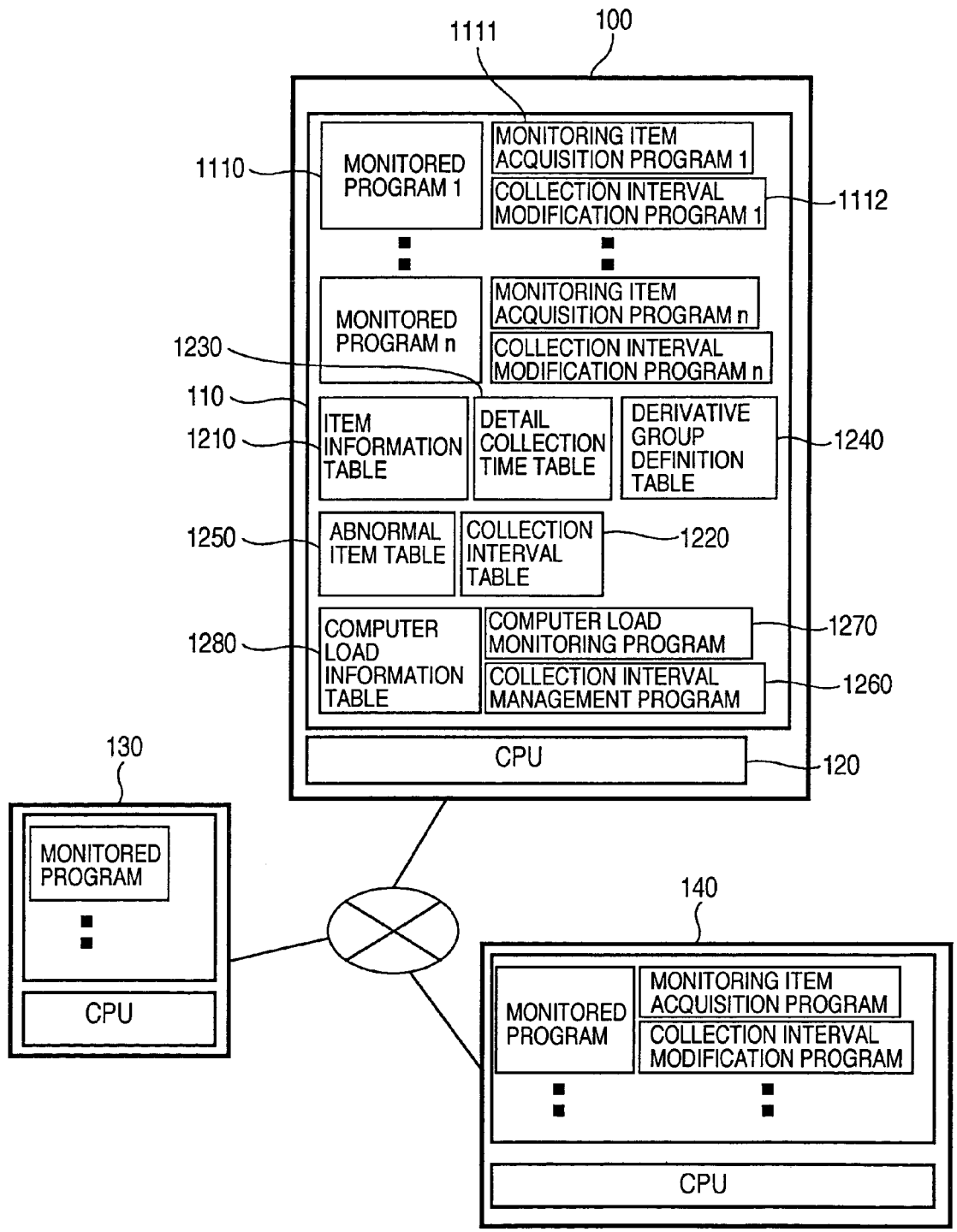
FIG. 1 shows configuration of computers connected in such a manner that they can communicate with one another according to an embodiment of the present invention.

FIG. 1 shows configuration of a system including computers connected in such a manner that they can communicate with one another according to an embodiment of the present invention. In FIG. 1, a plurality of computers (100, 130, 140) are connected via a network.

Here, explanation will be given on the configuration of the computer 1 (100) as an example of the computers used in this embodiment. The computer 100 includes a storage unit 110 containing programs and data and a processing unit 120 such as a CPU for executing the programs stored in the storage unit. The storage unit 110 contains a program 1110 (such as an application program and OS) to be monitored, a monitoring item acquisition program 1111 for monitoring the respective programs, and a collection interval modification program 1112 for modifying the collection interval as a timing for acquiring the value of the item by the monitoring item acquisition program.

Moreover, the storage unit contains an item information table 1210 where information on the items to be monitored is registered and a collection interval table 1220 where information on collection intervals of the respective items is registered. Moreover, the storage unit contains a derivative group definition table 1240 where groups each consisting of some items are correlated and registered.

A group consisting of at least one item is a derivative group of one item. This means in the derivative group definition table 1240, that the group is registered with linking to the item. Each derivative group may consist of items associated with the same one program or associated with more than one different programs. Moreover, each derivative group may consist of items associated with a program which is executed on more than one different computers. It should be noted that in the derivative group definition table 1240, names indicating the respective derivative groups are registered in a field 520 in FIG. 5.

In the embodiment explained below, when a value of a certain item is judged to be abnormal, the interval of items belonging to the derivative group of this item is reduced. When a value of an item ($\alpha i$) is judged to be abnormal and the collection interval $\alpha 1$ of the derivative group ($\{\beta 1, \beta 2 \ldots, \beta n\}$) defined for the $\alpha i$ is reduced, the item $\alpha i$ will be called an abnormal item for each item belonging to the derivative group. That is, if the item $\alpha$ is an abnormal item of the item $\beta$, the item $\beta$ belongs to the derivative group of $\alpha$ and when the value of the item $\alpha$ becomes abnormal, the interval of each item belonging to the derivative group to which the item $\beta$ belongs is reduced.

An abnormal item table 1250 is a table in which items belonging to a derivative group and their abnormal items are correlated and the abnormal items for the respective items are modified as needed by a collection interval management program 1260 or the like. Furthermore, the collection interval management program 1260 is stored. The program operates as follows. When the value of a certain item has become abnormal, the derivative group of the item is extracted from the derivative group definition table 1240 and notification to reduce the interval of each item extracted is issued to a collection interval modification program 1112. Furthermore, a computer load monitoring program 1270 for collecting values of items associated with a computer load such as the CPU use ratio and disc capacity and a computer load information table 1280 having information on the state of items related on the computer load are stored.

The computer 2 (130) and the computer 3 (140) have the same configuration as the computer 1 (100). In the embodiment below, explanation is given on a system including three computers. However, the present invention is not limited to this configuration. That is, the system may include only one computer or more than one computers connected in such a manner that they are communicate with one another. Moreover, when monitoring a system including more than one computers, each computer may not have the collection interval management program. That is, only one computer among the computers constituting the system can have the collection interval management program 1260. Moreover, it is also possible to execute the collection interval management program 1260 in the computer where no program to be monitored is executed.

Hereinafter, explanation will be given on details of the respective tables and the operation of the programs. FIG. 2 shows the collection interval table 1220. This table has information on the collection interval which is an interval for collecting values of items by the monitoring item acquisition program 1111 for each item. For an item name 200, item names to be monitored are registered. As an item, for example, there is an access frequency 201 of an application program (referred to as the AP1) indicating the frequency of the access to the database management system by the AP1. Moreover, the item associated with computer load (such as CPU use state, memory use state) can also be registered as a monitoring object item. The items to be monitored are set by a user.

The collection interval 210 is an interval for collecting a value of each item. For example, FIG. 2 shows that the value of the item which is the AP1 access frequency is collected every 30 seconds. These intervals are set in advance by a user before starting collection of the items and modified as needed according to the state of the item to be monitored, by the collection interval modification program 1112. In the embodiment below, the value set as the collection interval 210 of each item in advance by the user will be referred to as an "initial value".

Moreover, in the initial value 220 of FIG. 2, it is assumed that a value identical to the value set by the user as the initial value of the collection interval 210 is registered. When modifying the interval of each item, the possible maximum value and the possible minimum value of the interval are set by the user as the maximum value 260 and the minimum value 250.

In the collection state 230, one of the states "normal state", "degeneration state", "detail state" and "temporary stop state" is registered for each item. These are used when modifying the collection interval 210 and are modified as needed according to the item state and the collection interval 210 by the collection interval modification program 1112. When the collection state of an item is "normal state", the interval 210 of the item is equal to the initial value 220 set for this item. Moreover, when the collection state of an item is the "detail state", the interval 210 is smaller than the initial value 220. The "degeneration state" means that the interval 210 is greater than the initial state 220. Moreover, the "temporary stop state" means a state that the collection interval 210 is not modified by the collection interval modification program 1112. A fluctuation reference value 240 is a value serving as a reference to reduce or increase the interval when modifying the interval of an item according to the fluctuation ratio of the item. The fluctuation reference value 240 is set by a user.

FIG. 3 shows an example of the item information table 1210. This is used when modifying the collection interval and consists of conditions for modifying or not modifying the collection interval of each item. In the item name, like in FIG. 2, the item name to be monitored is registered by the user in advance. "In a "normal state definition" (310), a condition for the value of each item is registered. The item state is "normal" if the value of each item satisfies the condition. For example, in the item of access frequency 301 of the AP1, 20/s or below (311), i.e., the state that access request made for one second is 20 times or below is registered as a normal state. In the normal state definition 310, each item is set by the user.

In the item state 320, a normal state or an abnormal state is set. If the value of the item collected satisfies the condition of the normal state registered for this item, "normal" is registered. Otherwise, "abnormal" is registered. The item state 320 is modified as needed according to the state of each item by the collection interval modification program 1112 or the like. A previous acquisition item value 330 is the latest value in the items collected previously for each item and is updated as needed by the monitoring item acquisition program 1111.

FIG. 4 is a computer load information table 1280 where the state of the item 400 associated with the computer load is registered. The item registered here is monitored by the computer load monitoring program 1270. This table used according to the computer load when modifying the collection interval of the item to be monitored and registered in FIG. 2. In FIG. 4, in the item name 400, items associated with the computer load are registered. The items registered in the item name 400 may be partially or entirely overlap with the items associated with the computer load among the items registered in the item information table of FIG. 2. A normal state definition 410, like in FIG. 3, contains the condition of the value of each item. The "normal" state is set if the condition is satisfied. An item state, like in FIG. 3, indicates whether currently normal or abnormal. Moreover, the interval, for collecting the value of each item is registered in the collection interval 430. A previous acquisition item value 440 is the latest value among the values collected prior to the presence.

FIG. 5 is a derivative group definition table 1240. Here, a group (derivative group) 510 consisting of at least one item is related to each item 500 and registered. The derivative group for each item is set together with the group name 520 by the user. It should be noted that the derivative group defined for each item may be an item associated with only one program executed on the same computer as each item or an item associated with more than one programs executed on the same computer. Moreover, it may consist of an item associated with a program executed on more than one different computers. When there is a derivative group consisting of an item associated with a program executed on different computers, it is possible to register in the derivative group definition table 1240 information indicating on which computer a program associated with the item belonging to each derivative group is executed.

FIG. 6 is an abnormal item table 1250. In a derivative item 600, items registered in the derivative group 510 of FIG. 5 are registered. This is set in advance by the user. In an abnormal item 610, abnormal items of the respective derivative items are registered. For example, the access frequency 601 of AP2 is an item belonging to a derivative group of item: AP1 wait time (611). Since the AP1 wait time (611) is in the abnormal state and the collection interval is reduced, as the abnormal item of the access frequency of AP2, the AP1 wait time is registered. The abnormal items of the respective derivative items are updated as needed according to the item state by the collection interval management program 1260.

Figure 7:
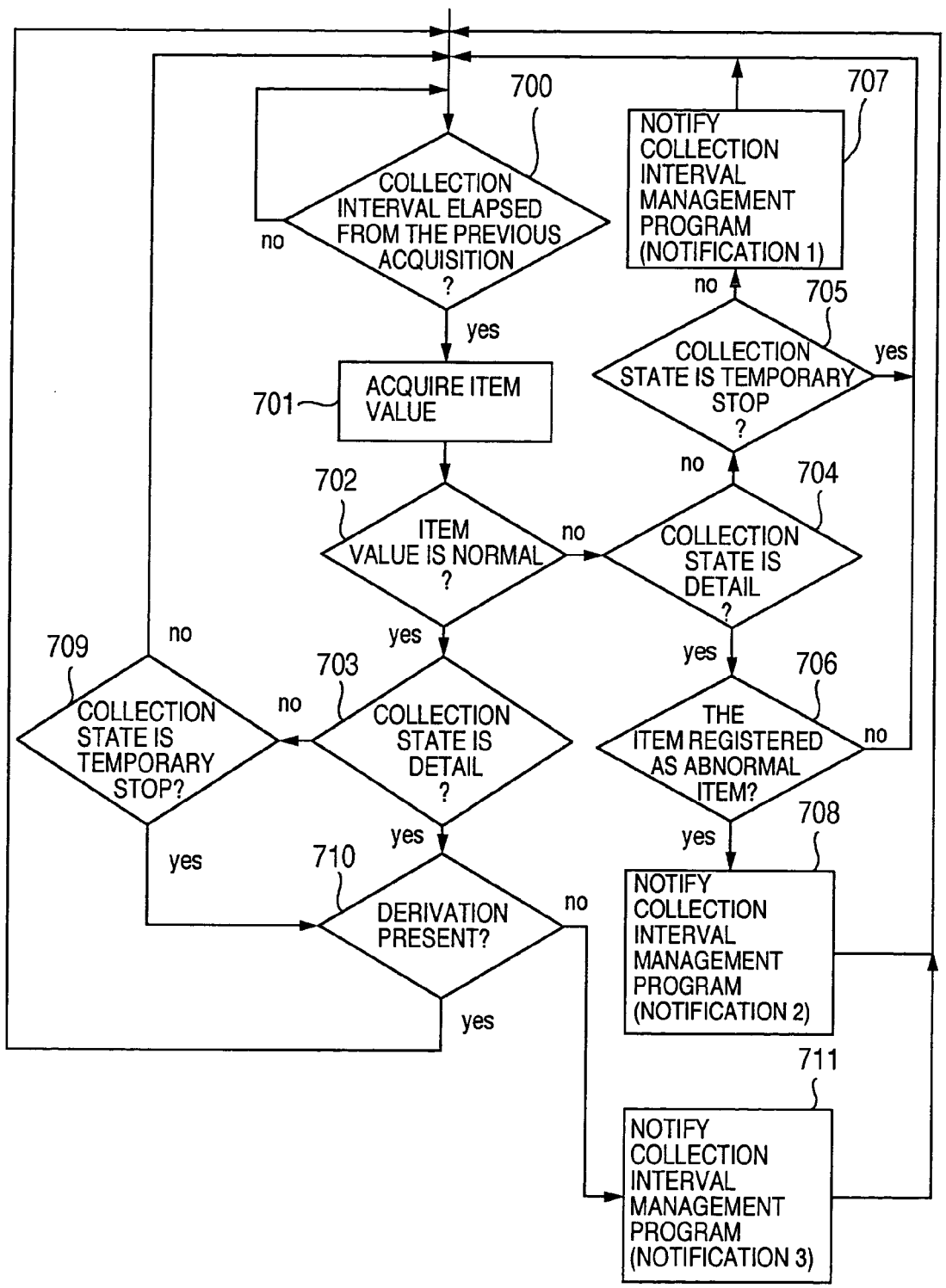
FIG. 7 is a flowchart showing operation of a monitoring item acquisition program.

FIG. 7 is a flowchart showing operation of the monitoring item acquisition program 1111 according to the embodiment of the present invention. The monitoring item acquisition program selects one ($\alpha 1$) of the items registered in the item name 200 of the collection interval table 1220 (FIG. 2). As a method for selecting the item, for example, the items registered in the item name 200 may be successively selected from the top but the method is not limited to this. In step 700, it is judged whether a predetermined collection interval of the item has elapsed after the value of the item for the item $\alpha 1$ has been acquired previously. If the time has elapsed, the value of the item $\alpha 1$ is acquired (701). Next, it is judged whether the value of the acquired item satisfies the "normal" condition decided for the item by referencing the normal state definition 310 of the item information table 1210 (FIG. 3) (702). If the result is "abnormal", it is judged whether the collection state is "detail" by referencing the collection state 230 of the collection interval table 1220 (FIG. 2) for the item $\alpha 1$.

If the collection state is other than the "detail", it is judged whether the collection state of the item $\alpha 1$ is "temporary stop" (705). As will be detail later, when the computer load has become large, reduction of the collection interval of the monitoring object item is temporarily stopped so as to prevent further increase of the load. Accordingly, when deciding whether to reduce the collection interval, it is necessary to judge whether the collection state is "temporary stop". If the collection state is judged to be other than the "temporary stop", notification 1 is issued to the collection interval management program 1260 (707). The notification 1 is used to reduce the collection interval of the item belonging to the derivative group of item $\alpha 1$. As has been described above, the collection interval management program 1260 to which the notification is issued may be the same computer as the computer where the monitoring item acquisition program 1111 which has acquired the value is executed or may be a different computer.

Figure 8:
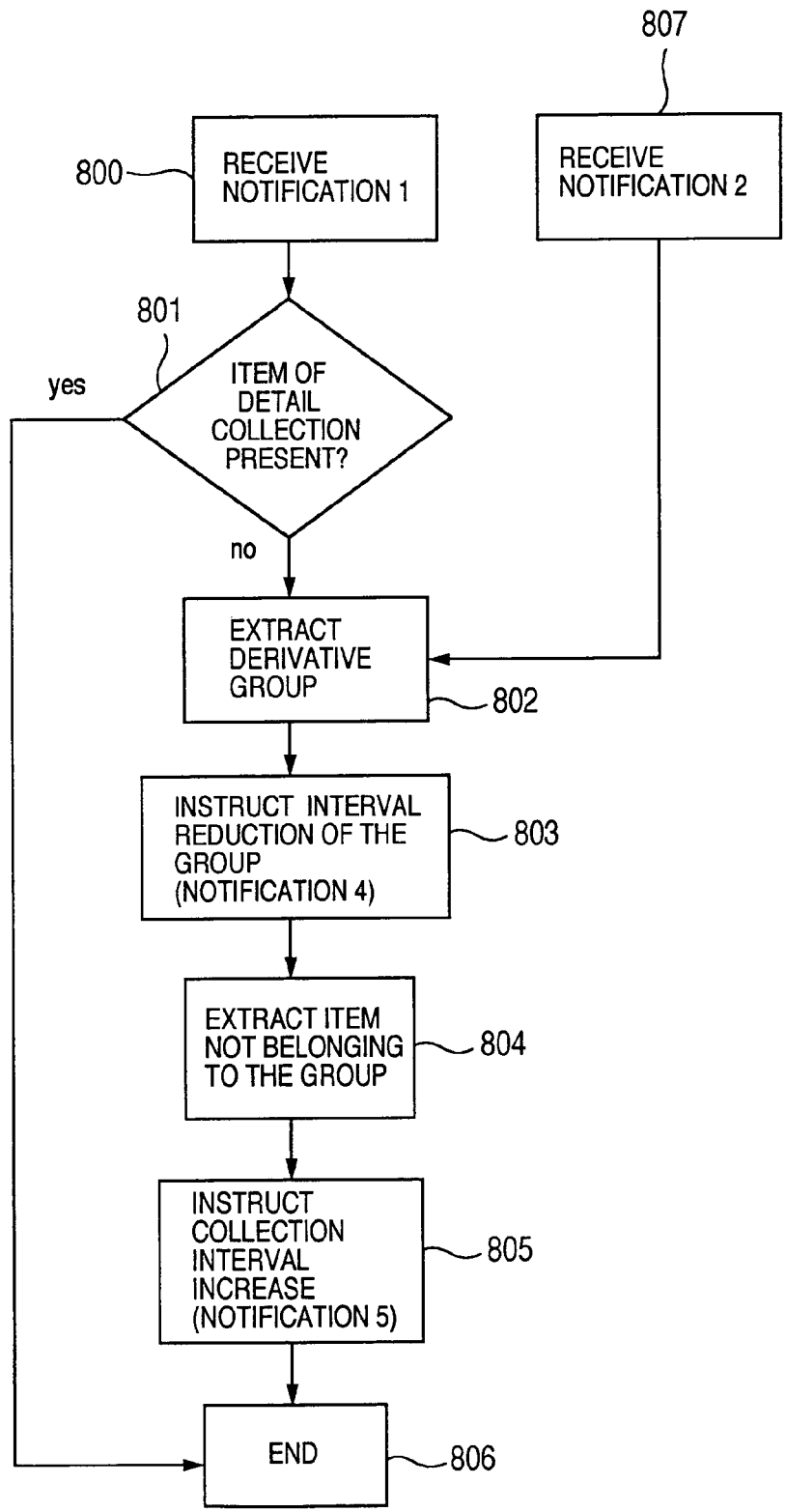
FIG. 8 is a flowchart showing a first operation of a collection time interval management program.

FIG. 8 is a flowchart showing operation of the collection interval management program 1260. The collection interval management program receives the notification 1 (800) and references the collection state 230 of the collection interval table 1220 (FIG. 2) so as to judge whether there is an item in the "detail collection" state (801). If there exists an item in the "detail collection" state, the processing is terminated (806). This means that there is already an item other than $\alpha 1$ whose collection interval has been reduced due to an abnormal state and the collection interval of the item $\alpha 1$ is not reduced. Thus, it is possible to suppress increase of the computer load caused by simultaneous reduction of the collection intervals of a plenty of items.

In step 801, if there is no item in the "detail" state, an item belonging to the group is extracted from a group corresponding to the item $\alpha 1$ of the derivative group table (FIG. 5) (802). For the respective items extracted, notification 4 instructing reduction of the collection interval is issued to each collection interval modification program 1112 modifying the collection interval of each item (803). The collection interval modification program 1112 to which the notification is issued may be executed on the same computer as the collection interval management program 1260 or may be executed on a different computer or may be executed both on the same computer and the different computer.

Next, items not belonging to the derivative group associated with the item $\alpha 1$ are extracted (804) and notification 5 instructing to increase the collection interval of the respective items extracted is issued to the collection interval modification program 1112 having the function to modify the collection interval of each item (805). Thus, the increase of computer load by the reduction of the collection interval of some items in step 803 can be suppressed by increasing the collection interval of the other items. Here, the items whose collection interval is increased is selected from those not belonging to the derivative group associated with the item $\alpha 1$ and accordingly, it is possible to collect detail information on the derivative group associated with the item $\alpha 1$.

It should be noted that in step 804, when selecting an item whose collection interval is to be increased, the number of items to be selected may be set appropriately depending on the value of the item associated with the computer load and the number of items belonging to the group whose collection interval has been reduced. For example, the more items become objects of the instruction of the interval reduction, the collection intervals of more items may be increased. However, the present invention is not limited to this method. Moreover, as a method for selecting the item whose collection interval is to be increased, for example, among the items registered in FIG. 2, it is possible to select items not belonging to the derivative group whose collection interval is to be reduced in the order of registration in the table. However, the present invention is not limited to this method.

Figure 12:
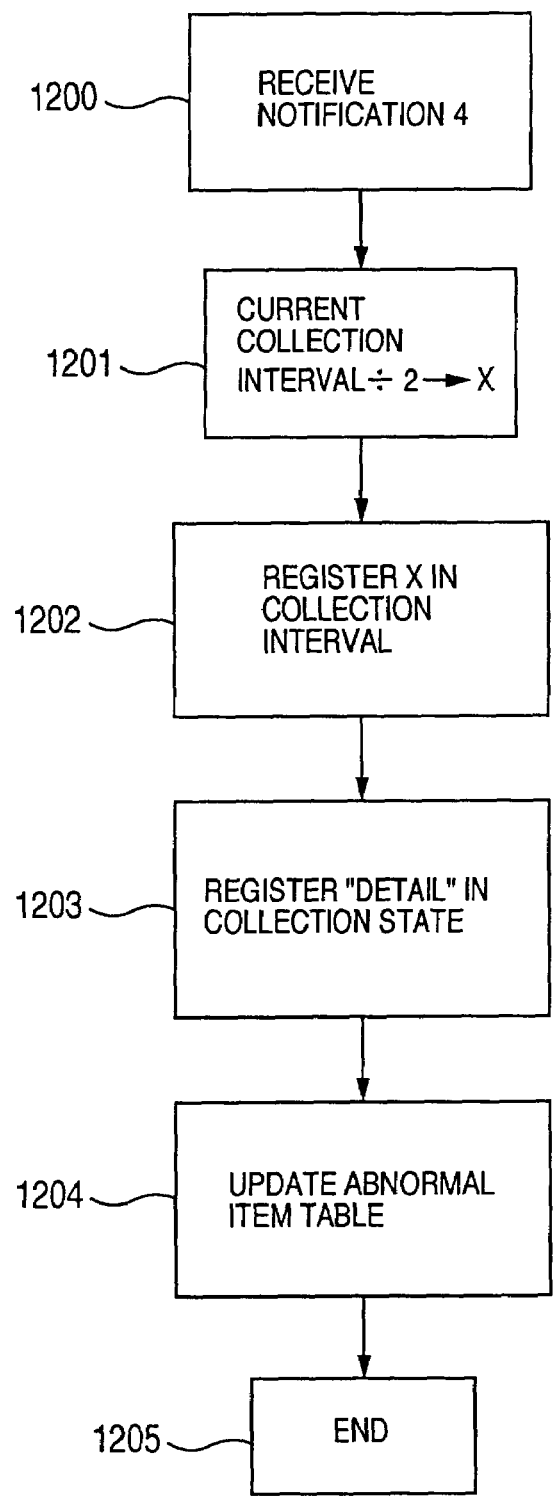
FIG. 12 is a flowchart showing a first operation of a collection time interval modification program.

FIG. 12 is a flowchart showing operation of the collection interval modification program 1112 which has received the notification 4. Upon reception of the notification 4 (step 1200 in FIG. 12), the current interval of the collection interval table 1220 (the collection interval 210 of FIG. 2) is referenced and this value divided by 2 is X which is stored (1201). Next, the X is stored as a new collection interval in the interval 210 (1202). Furthermore, "detail" is stored in the column 230 of the collection state (1203). Lastly, in the abnormal item table 1250 of FIG. 6, the item $\alpha 1$ is registered in the column of "abnormal item" corresponding to the item whose interval has been reduced (1204) and the processing is terminated (1205). It should be noted that in step 1201, an arbitrary positive number may be used instead of the numeric 2 used for calculating the new collection interval X.

Figure 13:
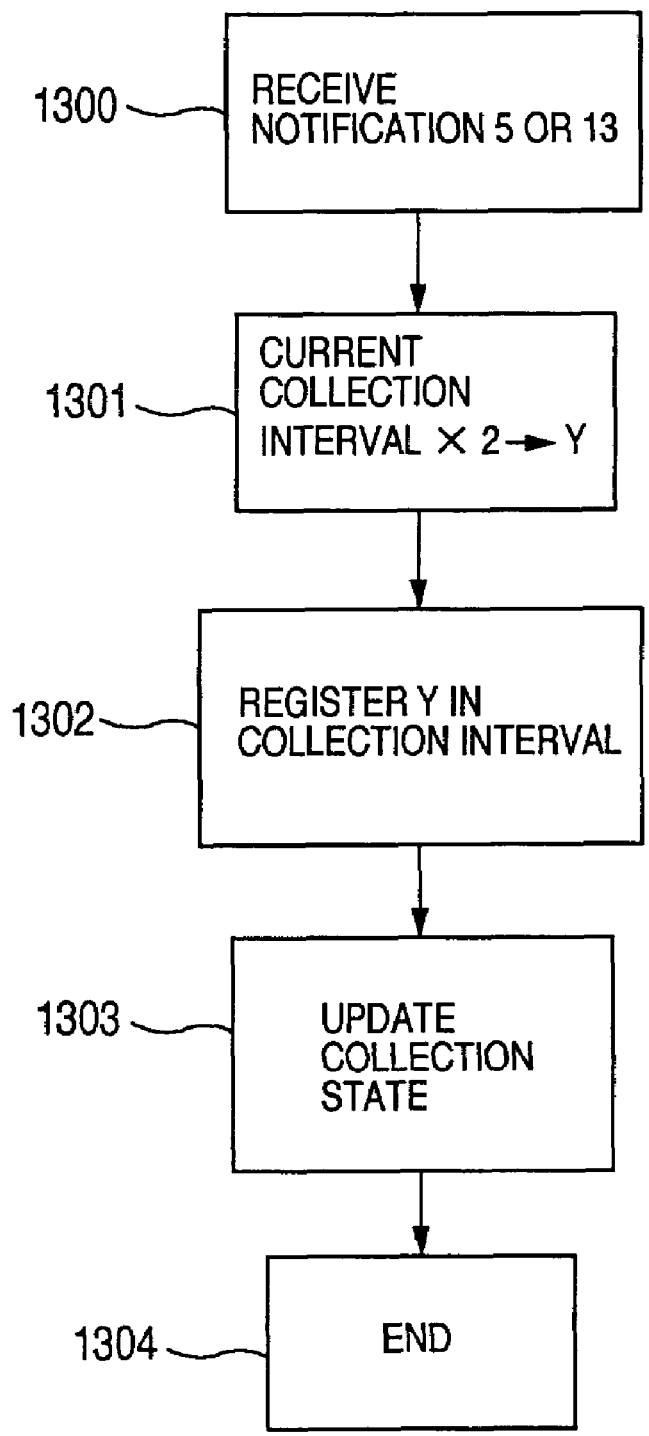
FIG. 13 is a flowchart showing a second operation of a collection time interval modification program.

FIG. 13 is a flowchart showing operation of the collection interval modification program 1112 which has received notification 5. Upon reception of the notification 5 (1300), the current collection interval multiplied by 2 is made Y which is stored (1301) and the Y is registered as a new collection interval (1302). Next, in step 1303, the collection state of the item whose interval has been increased is set to "degeneration" (1303) and the processing is terminated (1304). Instead of the numeric 2 used in step 1301, it is possible to use another positive number.

When the collection state is judged to be "detail" in step 704 of FIG. 7, it is judged whether the item α1 itself is registered as an abnormal item of the item α1 in the abnormal item table 1250 (FIG. 6). If the item α1 itself is registered as an abnormal item, notification 2 is issued to the collection interval management program (708). This notification means that since the collection interval of the derivative group decided for the item α1 is reduced and the item α1 is in an abnormal state, the collection interval of the derivative group decided for the item α1 is to be further reduced. Thus, it is possible to collect more detail information on the derivative group decided for the item α1. Moreover, in step 706, if the item α1 is not registered as an abnormal item, the processing is terminated. This means that since the collection interval for the derivative group decided for the item α1 is not reduced and the collection interval for a derivative group for another item containing the item α1 is already reduced, the processing is terminated without modifying the collection interval of the derivative group for the item α1.

The collection interval management program 1260 which has received the notification 2 operates in the same way as the collection interval management program which has received the notification 1 which has been explained with reference to FIG. 8.

In step 702 of FIG. 7, if the value of the acquired item is "normal", the collection interval table (FIG. 2) is referenced and it is judged whether the collection state of the item α1 is "detail" (703). If the collection state of the item α1 is judged to be "detail", the abnormal item table 1250 (FIG. 6) is referenced and it is judged whether the item α1 has derivation (710). Here, an item having derivation means that in the abnormal item table 1250, an item other than that item is registered as an abnormal item of that item. If no derivation is present, notification 3 is issued to the collection interval management program 1260 (711). This means that since the item α1 is in a normal state and has no derivation, the collection interval of the derivative group for the item α1 is recovered to the initial value.

In step 703, if the collection state of the item α1 is judged to be other than "detail", the collection interval table 1220 (FIG. 2) is referenced and it is judged whether the collection state of the item α1 is "temporary stop" (709). If the collection state is "temporary stop", it is judged whether derivation is present (710). If there is no derivation, the notification 3 is issued to the collection interval management program 1260 (711). This also recovers the collection interval of the derivative group for the item α1 to the initial value.

Figure 9:
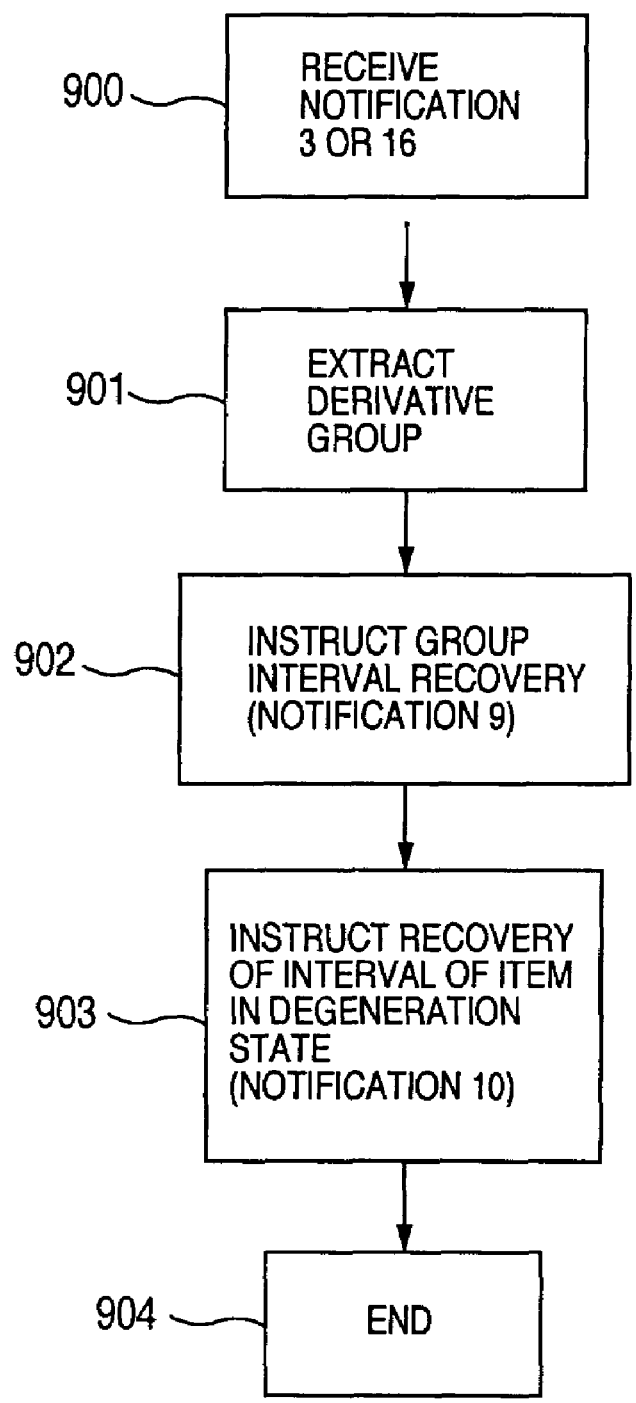
FIG. 9 is a flowchart showing a second operation of a collection time interval management program.

FIG. 9 is a flowchart indicating operation of the collection interval management program 1260 which has received the notification 3. The collection interval management program receives the notification 3 (900) and references the derivative group definition table 1240 (FIG. 5) so as to extract an item belonging to the derivative group of the item α1 (901). Next, notification 9 is issued to instruct to recover the collection intervals of the respective items extracted to the initial values (902).

Furthermore, notification 10 is issued to instruct to reference the collection interval table 1220 (FIG. 2) so as to extract items in the degeneration state and recover the collection intervals of the items extracted to the normal intervals (903) and the processing is terminated (904). In step 902, the collection intervals of the items whose collection intervals have been reduced due to the abnormality of the item α1 are recovered to the initial values. In step 903, the collection intervals of the items whose collection intervals have been increased to suppress increase of the computer load due to the reduction of the collection interval of the derivative group for the item α1 are recovered to the initial values.

Figure 14:
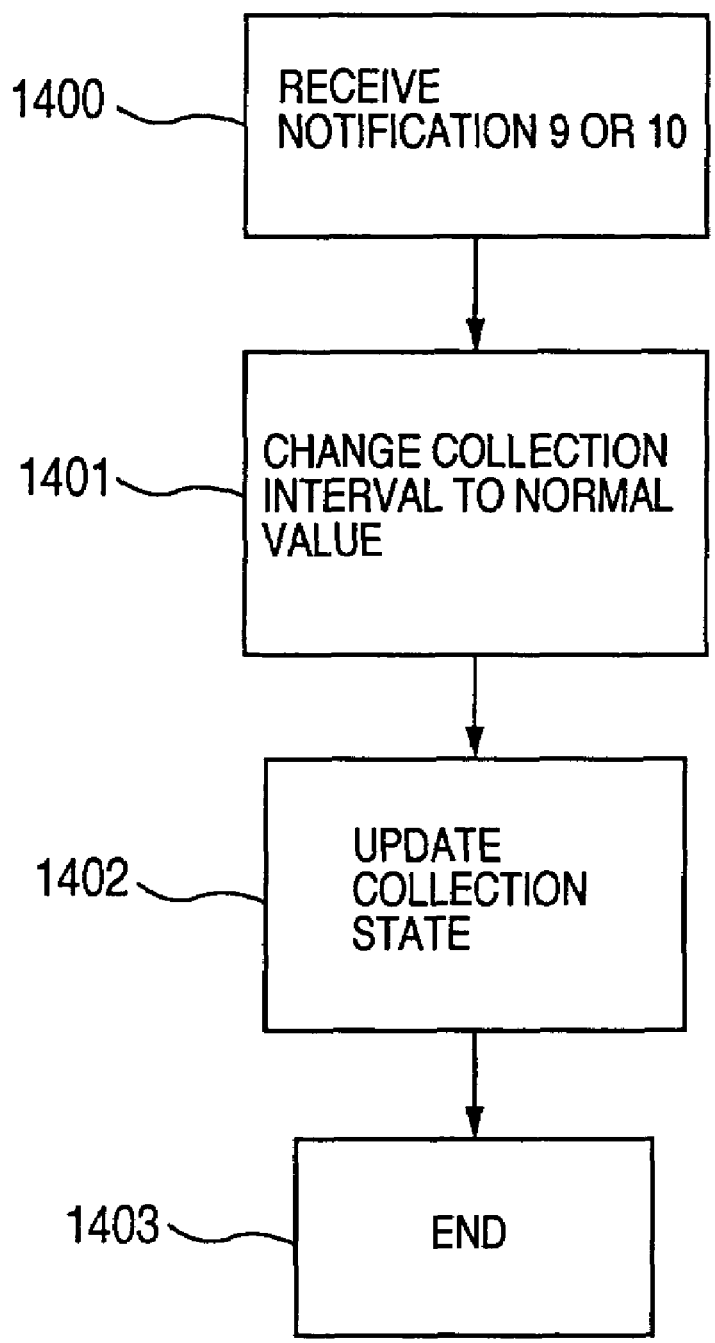
FIG. 14 is a flowchart showing a third operation of a collection time interval modification program.

The collection interval modification program 1112 receives the notification 9 (step 1400 in FIG. 14) and registers the value registered as an "initial value" of the collection interval table 1220 in the column "interval" of the table (1401). Furthermore, the collection state (230) is set to "normal" (1402) and the processing is terminated (1403). The operation performed when notification 10 is received is identical to this.

Figure 15:
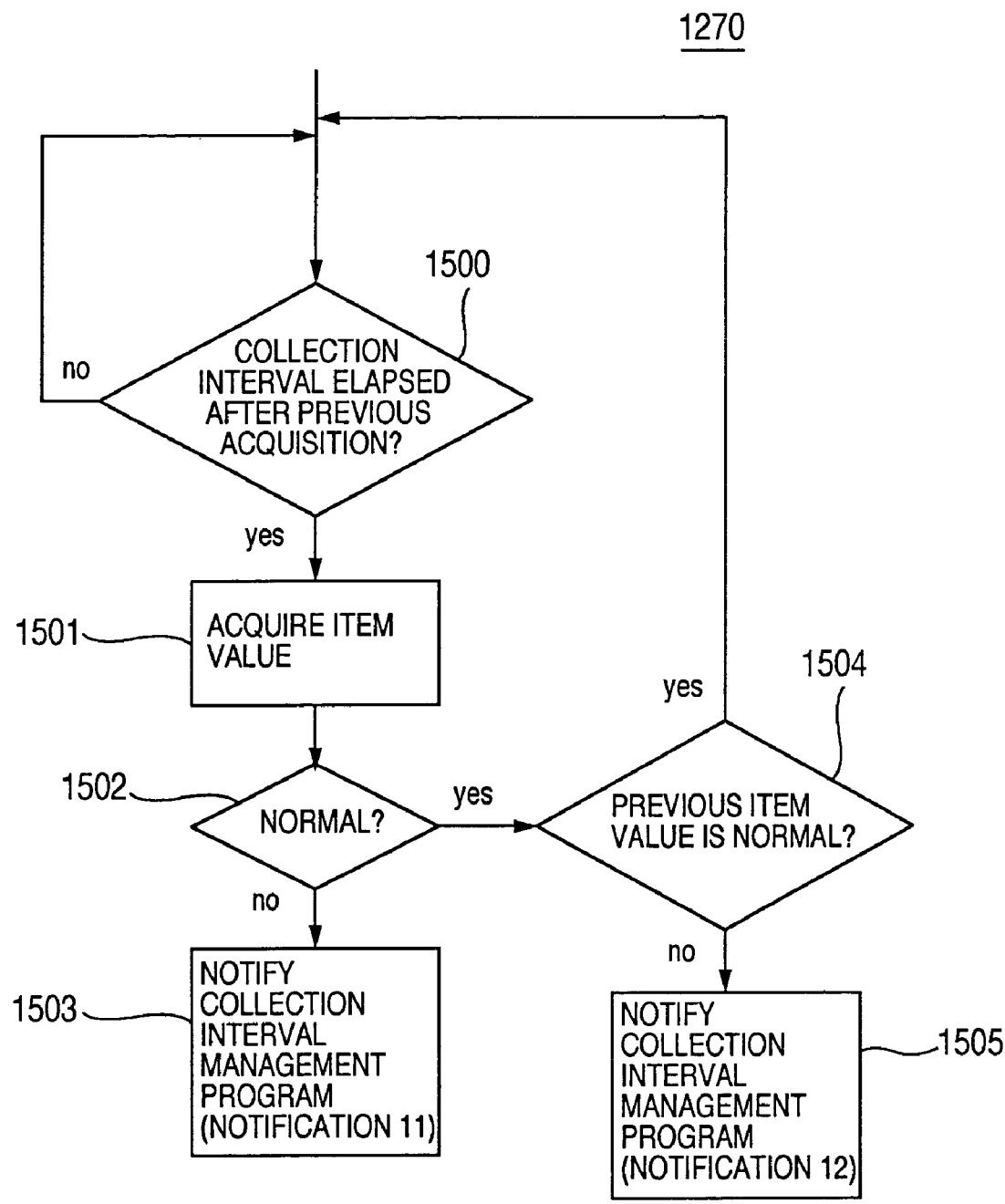
FIG. 15 is a flowchart showing operation of a computer load monitoring program.

FIG. 15 is a flowchart indicating operation of a computer load monitoring program 1270 according to the embodiment of the present invention. The computer load monitoring program selects one of the items registered on the computer load information table 1280 (FIG. 4). The method for selection may be, for example, sequential selection in the order of registrations in the table but the method is not to be limited to this. In step 1500, it is judged whether the collection interval (field 430 of FIG. 4) registered for the item associated with the computer load to be monitored has elapsed from the moment when the value has been acquired previously (1500).

If the collection interval has elapsed, the value of the item is acquired (1501) and the abnormal state definition 410 of the computer load information table 1280 is reference to judge whether the value acquired is normal (1502).

If the value is not normal, notification 11 is issued to the collection interval management program 1260 (1503).

Figure 10:
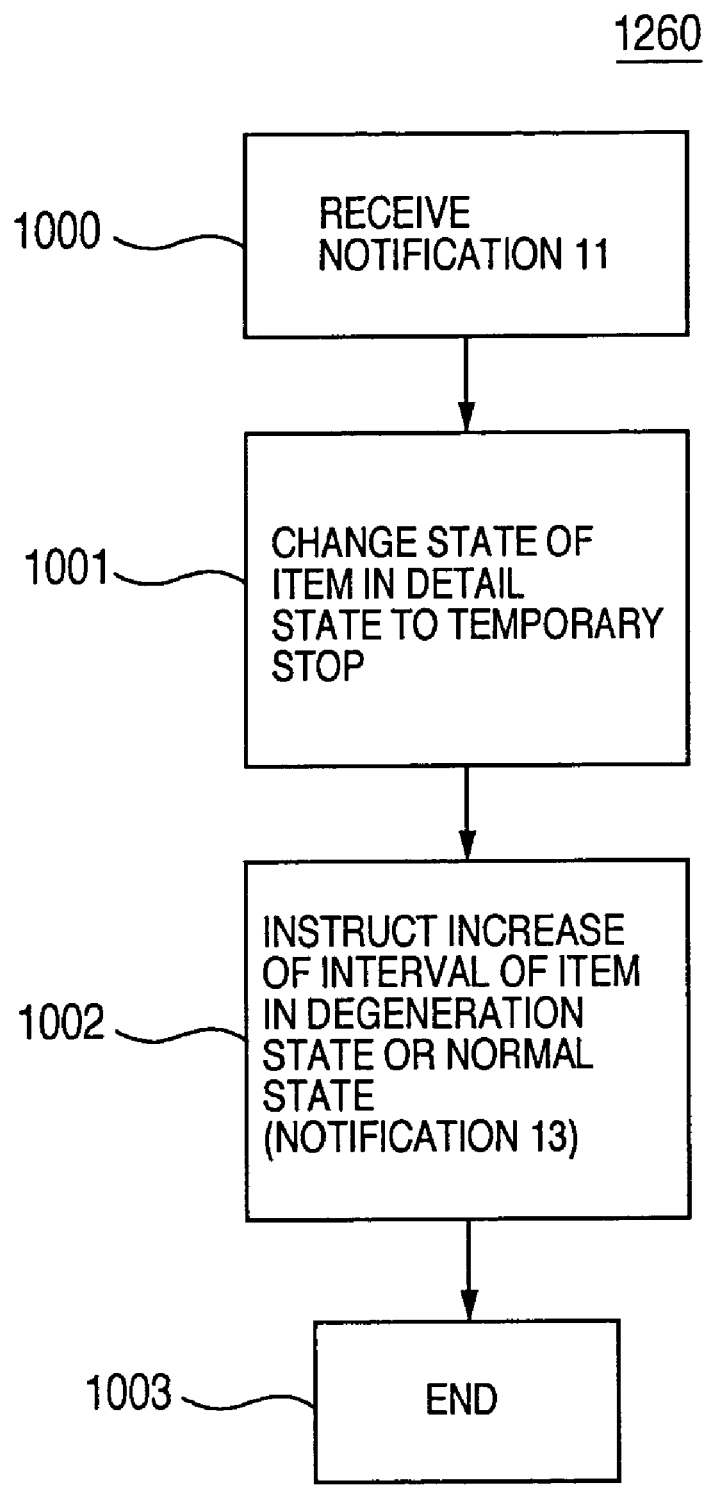
FIG. 10 is a flowchart showing a third operation of a collection time interval management program.

FIG. 10 is a flowchart showing operation of the collection interval management program 1260 which has received the notification 11. Upon reception of the notification 11 (1000), the collection state for each item whose collection state 230 is "detail" in the collection interval table 1220 is modified to "temporary stop" (1001). Next, notification 13 instructing to increase the collection interval for the items in the regenerate state or normal state is issued to the collection interval modification program 1112 (1002) and the processing is terminated (1003).

The notification 11 is issued because the value of the item concerning the computer load has become abnormal. Now, the collection interval for the items in the detail collection state may be further reduced to further increase the computer load. According to the present embodiment which is realized by the notification 11 and the operation of the collection interval management program 1260 which has received the notification 11, the collection state of items in the detail collection state is modified to the temporary stop state so as to temporarily stop the reduction of the collection interval, thereby preventing further increase of the computer load. Here, the collection interval of the items which has been modified to the temporary stop is maintained to the value before the modification of the collection state and accordingly, it is possible to collect information detail as before the modification of the collection state. Moreover, when the interval of the item in the detail collection state is modified to the temporary stop state, the collection interval of the item in the regenerate state or the normal state is increased, so as to reduce the computer load.

It should be noted that in this invention, as the operation of the collection interval management program 1260 which has received the notification 11 (FIG. 10), it is possible only to issue a notification to increase the collection interval of the item in the normal or degeneration state (1002).

In step 1502 of FIG. 15, if the value of the item is judged to be normal, then it is judged whether the previously acquired item value 440 of the computer load information table 1280 (FIG. 4) is normal or not. If the value is judged to be abnormal, and if the states of all the other items registered in the computer load information table 1280 are normal, then notification 12 is issued to the collection interval management program 1260 (1505).

Figure 11:
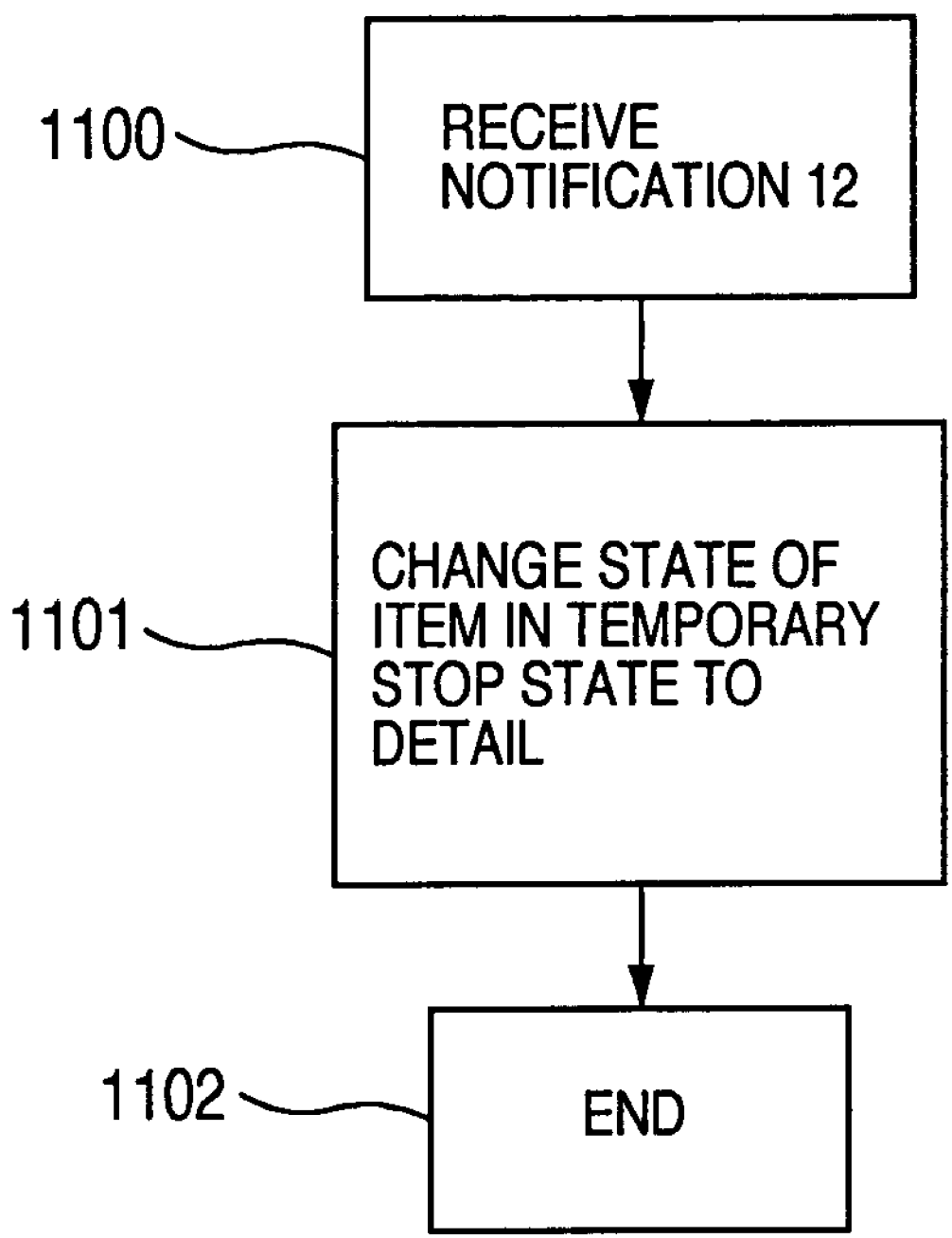
FIG. 11 is a flowchart showing a fourth operation of a collection time interval management program.

The collection interval management program 1260 receives the notification 12 (step 1100 in FIG. 11), modifies the collection state of the item whose collection state 230 is "temporary stop" in the collection interval table 1220 (FIG. 2) to the "detail" (1101), and terminates the processing (1102). According to the present embodiment described through the notification 12 and the operation for this, for the item whose collection interval has been stopped to be reduced because the item of the computer load was abnormal, the reduction of the collection interval is resumed when the item of the computer load is recovered to the normal state, thereby enabling detail information collection.

The first embodiment of the present invention has thus far been described.

Description will now be directed to a second embodiment of the present invention. In the aforementioned embodiment, there is only one derivative group performing detail collection at a certain time point. On the other hand, in the second embodiment, explanation will be given on a case when detail collection is performed simultaneously for two or more derivative groups. In this embodiment, for example, it is assumed that when a certain item $\alpha i$ is abnormal and the collection interval of the items belonging to the derivative group associated with the item $\alpha i$ is reduced, the value of an item $\alpha k$ other than the $\alpha i$ is abnormal.

Figure 18:
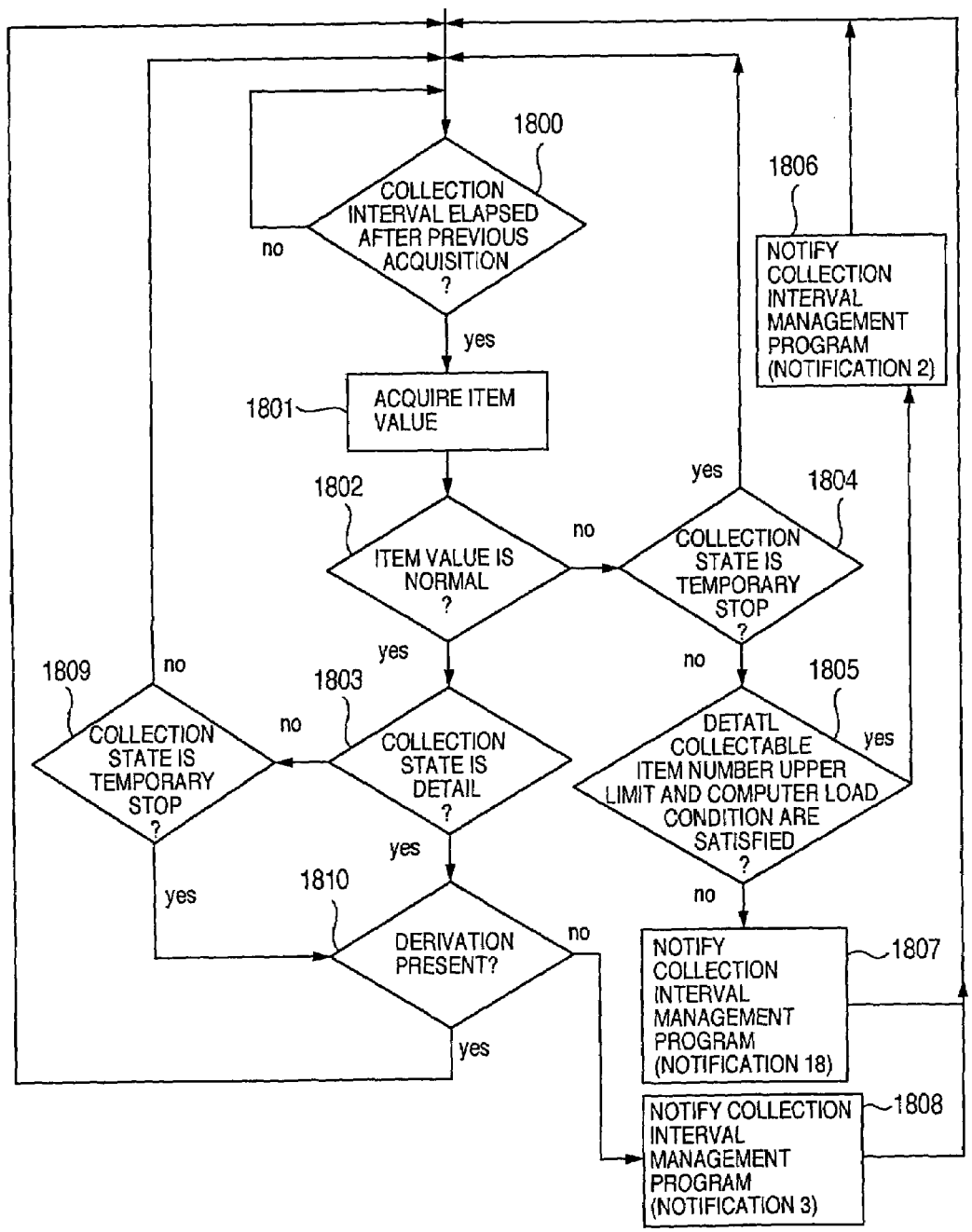
FIG. 18 is flowchart showing operation of an item value acquisition program.
Figure 19:
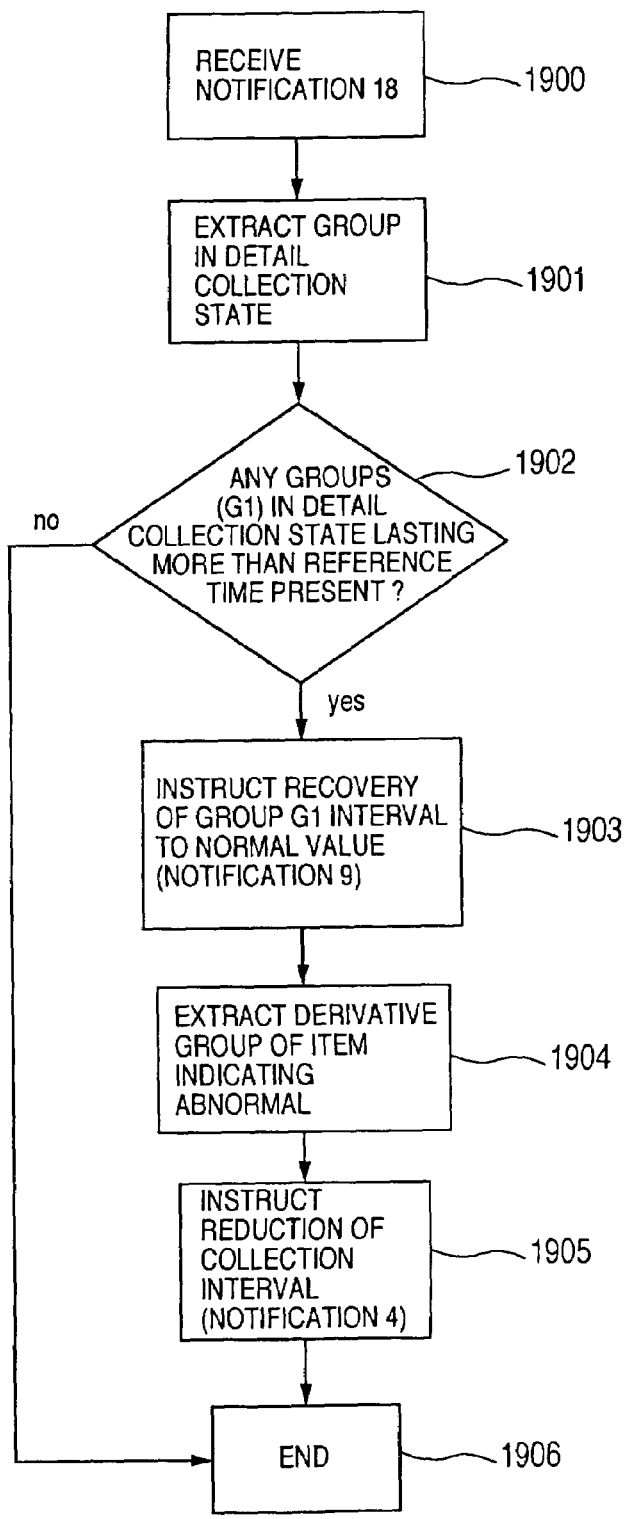
FIG. 19 is a flowchart showing operation of a collection time interval management program.

The present embodiment will be described with reference to FIG. 18, FIG. 19, and FIG. 20. FIG. 18 and FIG. 19 are flowcharts showing the operation of the monitoring item acquisition program 1111 and the operation of the collection interval management program 1260, respectively. Moreover, FIG. 20 is a detail collection time table 1230. This is used in the embodiment described below for judging the time during which each derivative group is detail-collected when derivative groups of a plurality of items have become abnormal and detail collection is performed alternately. In the derivative group 2100, derivative group names 520 registered in the derivative group definition table 1240 (FIG. 5) are registered. The detail collection time 2200 contains a time which has elapsed up to now from the moment when the detail collection has been started if each item belonging to the derivative group is currently in the detail collection state.

In this embodiment, when an item has become abnormal, if a derivative group has already been in the detail collection state for a predetermined period of time, the derivative group of the new item which has become abnormal is detail-collected and the aforementioned derivative group already in the detail collection state is modified to the normal collection. Here, the reference to decide whether to modify the derivative group already in the detail collection state to the normal state is registered as a reference time 2300. It should be noted that in the explanation of this embodiment, those portions different from the first embodiment will be explained in detail.

In FIG. 18, if a collection interval decided for a certain item ($\alpha i$) has elapsed from the moment when the value of $\alpha i$ was acquired previously (1800), the value of the item $\alpha i$ is acquired (1801). In step 1802, it is judged whether the acquired value is normal. If the value is normal, the programs operate in the same way as has been explained above.

In step 1802, if the value of the acquired item is judged to be abnormal, control is passed to step 1804 where the collection state of the item $\alpha i$ is judged to be whether temporary stop or not by referencing the item information table 1210 (FIG. 2). If the collection state is judged to be temporary stop state, the processing is terminated. If the collection state is judged to be other than the temporary stop, the upper limit (u) of the number of new items which can currently be detail-collected is compared to the number of items belonging to the derivative group associated with the item $\alpha i$ so as to judge whether the number of items exceeds the upper limit u. Furthermore, the computer load information table 1280 (FIG. 4) is referenced to judge whether any items associated with the computer load is in the "abnormal" state (1805). Here, as the initial value of the value u, a user sets a value under which collection intervals of all the items to be monitored are initial values.

After the monitoring is started, the value of initial value deleted by the number of items in the detail collection state at each time moment is registered as the u value at the moment. If the number of items belonging to the derivative group associated with the item $\alpha i$ does not exceed the u and the state of all the items associated with the computer load are all "normal", then in step 1806, notification 2 is issued to the collection interval management program 1260. The notification 2 is to reduce the collection interval of the items belonging to the derivative group associated with the item $\alpha i$. Operation (FIG. 8) of the collection interval management program 1260 and operation of the collection interval modification program 1112 which have received the notification 2 are identical to the operations explained in the first embodiment.

In step 1805, if the number of items belonging to the derivative group associated with the item $\alpha i$ exceeds the u or at least one of the items associated with the computer load is "abnormal", control is passed to step 1807 where notification 18 is issued to the collection interval management program. This means that the value of the item $\alpha i$ is abnormal but if the collection intervals of the items belonging to the derivative group associated with the item $\alpha i$ are reduced, there is a danger of further deteriorating the computer load which is currently abnormal. Accordingly, the processing shown below will be performed.

By referencing to FIG. 19, explanation will be given on the operation of the collection interval management program 1260 which has received the notification 18. In step 1901, the detail collection time table 1230 (FIG. 20) is referenced to extract the derivative group (G1, G2, . . . , Gk) currently in the detail collection state. It should be noted that "a derivative group is in the detail collection state" means that each of the items belonging to the group is in the detail collection state (the same meaning is used in the other portion of this Detail Description).

Next, in step 1902, for each of the extracted groups, it is judged whether the time which has elapsed after the group has entered the detail collection state (field 2200 of FIG. 20) is greater than the reference time (field 2300 of FIG. 20) predetermined for the group. In step 1902, if there is no group whose detail collection state time has elapsed more than the reference time, the processing is terminated.

If there are any groups whose detail collection state time has elapsed more than the reference time, one group (G1) is extracted from the groups by an appropriate method (for example, the group whose detail collection state time has elapsed more than any other groups). Next, in step 1903, notification 9 is issued to instruct modification of the collection interval for each of items belonging to the extracted groups to the initial values predetermined for the respective items. The operation of the collection interval modification program 1112 which has received the notification 9 is identical to the one explained in the aforementioned first embodiment.

Furthermore, in step 1904, items belonging to the derivative group related the item αi which has shown abnormality are extracted by referencing the derivative group definition table 1240 (FIG. 5). Next, in step 1905, notification 4 is issued to instruct reduction of the collection interval of each of the items extracted in step 1904. The operation (FIG. 12) of the collection interval modification program which has received the notification 4 is identical to the one explained in the first embodiment. As has been explained above, even if a plurality of items simultaneously become abnormal, values of items belonging to the respective derivative groups associated with the respective items which have become abnormal can be collected in detail while suppressing the computer load.

Description will now be directed to a third embodiment of the present invention. In this embodiment, for each of the items, the collection interval is varied for the item according to the value of the item. The method used below is as follows. When the absolute value of the variation ratio of the values currently acquired for the respective items and the values acquired previously is equal to or above a predetermined reference value, the collection interval of the item is reduced and when the variation ratio is smaller than the predetermined reference value, the collection interval is increased. However, the present invention is not limited to this method. It should be noted that explanation of the third embodiment will be given with reference to FIG. 2 to FIG. 17.

Figure 16:
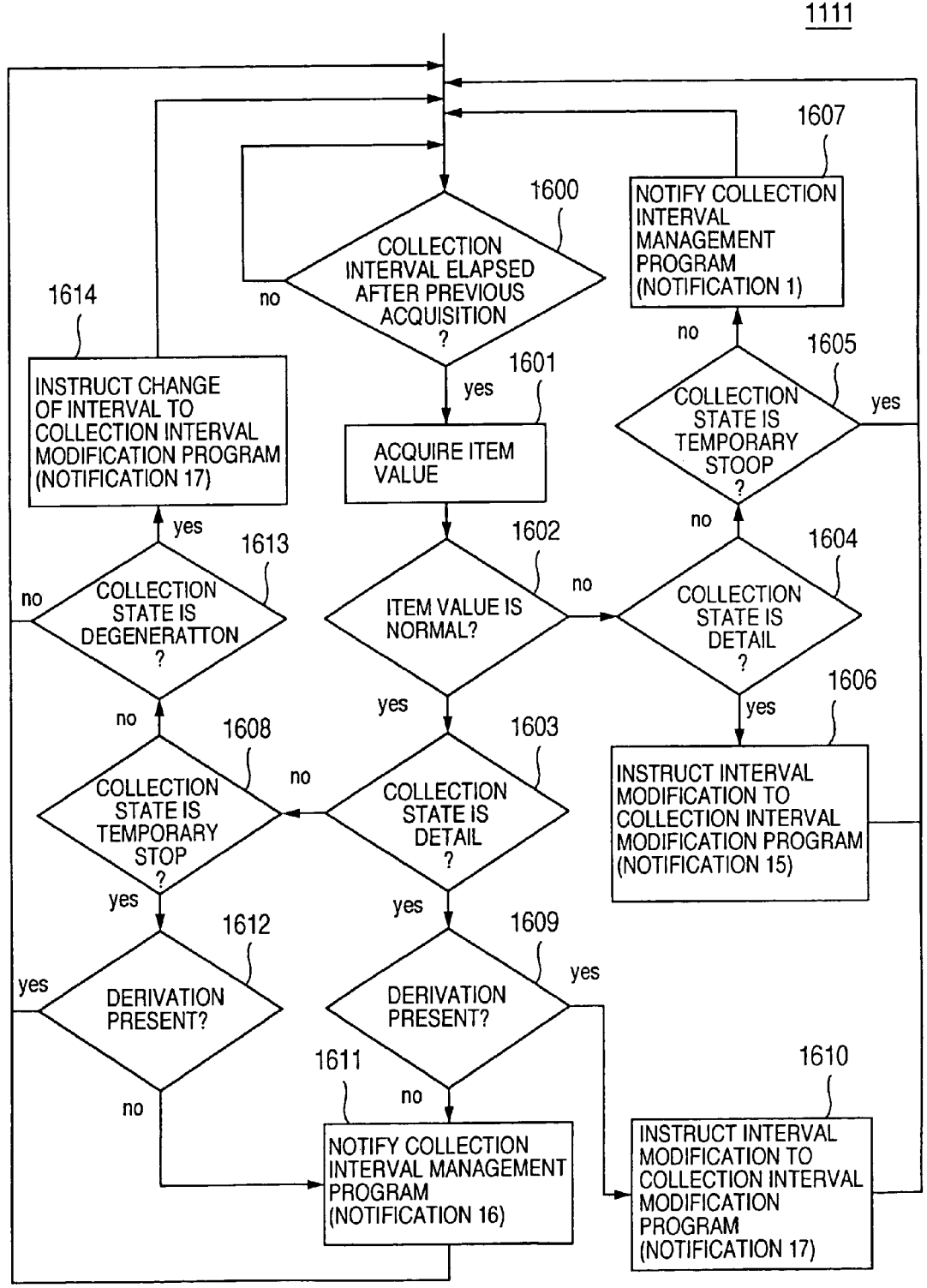
FIG. 16 is a flowchart showing operation of a monitoring item acquisition program.

FIG. 16 is a flowchart showing operation of the monitoring item acquisition program 1111 according to the third embodiment. In step 1600, it is judged whether the collection interval of an item (α2) has elapsed after the value of the item was acquired previously. If the time has elapsed, the value of the item α2 is acquired (1601). Next, it is judged whether the value of the acquired item satisfies the condition of "normality" predetermined for the item by referencing the normal state definition 310 in the item information table 1210 (FIG. 3) (1602). If the item value is judged to be "abnormal", then it is judged whether the collection state of the item α2 is "detail" by referencing the collection state 230 of the collection interval table 1220 (FIG. 2) (1604).

If the collection state is other than the "detail", it is judged whether the collection state of the item α2 is "temporary stop" (1605). If the collection state is judged to be other than the "temporary stop", the notification 1 is issued to the collection interval management program 1260 (1607). The notification 1 is used to reduce the collection interval of the derivative group associated with the item α2. The operation (FIG. 8) of the collection interval management program 1260 which has received the notification 1 and the operation of the collection interval modification program 1112 which has received the notification of instruction of the collection interval management program are identical to the ones explained in the first embodiment. It should be noted that as a new collection interval candidate X in step 1201 of FIG. 12, a value not smaller than the "minimum value" determined in FIG. 2 for the items whose collection intervals are to be reduced is selected. Moreover, as Y in step 1301 of FIG. 13, a value not greater than the "maximum value" determined in FIG. 2 for the items whose collection intervals are to be increased is selected.

In step 1604 of FIG. 16, if the collection state is judged to be "detail", then notification 15 is issued to the collection interval modification program 1112.

Figure 17:
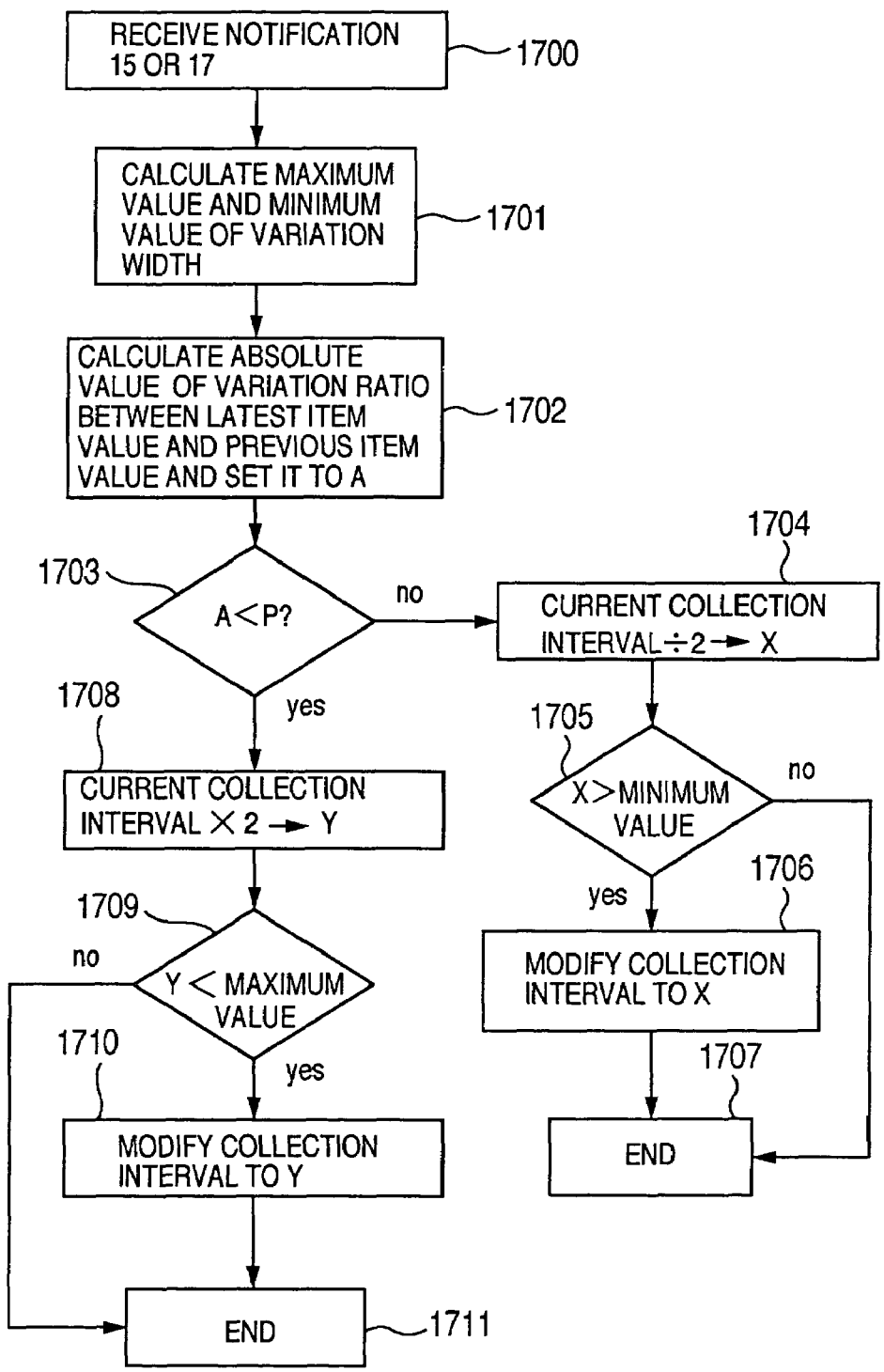
FIG. 17 is a flowchart showing operation of a collection time interval modification program.

FIG. 17 is a flowchart showing operation of the collection interval modification program 1112 which has received the notification 15. Upon reception of the notification 15 (1700), by referencing the collection interval table 1220 (FIG. 2), the minimum value (MIN) and the maximum value (MAX) of the variation width of the collection interval are extracted for use when modifying the collection interval according to the absolute value of the variation ratio (1701). That is, since the item α2 is in the detail collection state, the "minimum value" registered as MIN in the minimum value 250 is used and the "initial value" of the field 220 is used as MAX. It should be noted that as will be detail later, when modifying the collection interval according to the variation ratio for the item whose collection state is in "degeneration", the "initial value" of the field 220 is used as MIN and the "maximum value" of the field 260 is used as MAX.

Thus, in this embodiment, according to the collection state, the collection interval variation width MAX and MIN are changed. This can have the following effects. That is, in this embodiment, the collection interval is varied according to the absolute value of the value variation ratio for each item. Accordingly, even if the item is in the detail state, i.e., the collection interval for it has been reduced from the initial value, the collection interval is increased if the absolute value of the value variation ratio is smaller than the variation reference value. On the other hand, for the item in the degeneration state, i.e., the collection interval has been increased greater than the initial value to suppress the computer load, the collection interval is reduced if the absolute value of the value variation ratio is greater than the variation reference value.

Accordingly, there is a possibility that unless the upper limit value and the lower limit value of the variation width of the collection interval are changed according to the collection state, the collection interval is increased to an extent of the degeneration state even when the detail collection state is set in and detail information collection cannot be performed. Moreover, there is a possibility that even when the degeneration collection state is set in, the collection interval is reduced to an extend of the detail collection state and the computer load cannot be suppressed.

To cope with this problem, in this invention, for one and the same item, the upper limit and the lower limit of the variation width of the collection interval are changed according to the collection state. Accordingly, even when changing the collection interval according to the absolute value of the variation ratio of the item value, it is possible to suppress the computer load and reduce the collection interval of the item whose detail information is desired.

Next, by using the previously acquired item value 330 of the item information table 1210 (FIG. 3), the absolute value of the variation ratio of the latest item value of the item α2 and the previously acquired item value (variation ratio of the latest value with respect to the previously acquired value) is calculated and the calculation result is stored as A (1702). Next, the variation reference value of the collection interval table (field 240 in FIG. 2) is extracted (as P) and judgment is made whether A is smaller than P (1703).

If A is equal to or greater than P, the current collection interval registered in the field 210 of the collection interval table 1220 (FIG. 2) is divided by 2 to obtain a value which is stored as X (1704). Next, judgement is made whether X is greater than MIN (1705). If X is judged to be greater than MIN, X is registered as a new collection interval in the field 210 (1706). If X is judged to be equal to or smaller than MIN, the processing is terminated as it is (1707). Thus, when the item value variation ratio is greater than a predetermined reference value, the collection interval is reduced in a value range greater than MIN.

It should be noted that instead of the numeric 2 used in step 1704, it is possible to use other positive number. Moreover, in this embodiment, if X is judged to be greater than MIN in step 1705, the collection interval is modified to X (1706). Instead of this, it is also possible to modify the collection interval to X if the X is judged to be equal to or greater than MIN.

In step 1703, if the absolute value A of the variation ratio is smaller than the variation reference value P, the current collection interval is multiplied by 2 to obtain a value which is stored as Y (1708). Judgement is made whether the Y is smaller than MAX (1709). If the Y is judged to be smaller than MAX, the Y is registered as a new collection interval (1710). If Y is equal to or greater than MAX, the processing is terminated as it is (1711).

Thus, when the absolute value of the variation ratio is smaller than the reference value, the collection interval is increased in a value range smaller than MAX. The numeric 2 used in step 1708 may be replaced by other positive number. Moreover, in this embodiment, the collection interval is modified to Y if Y is judged to be smaller than MAX in step 1709 (1710). However, it is also possible to modify the collection interval to Y if Y is judged to be equal to or smaller than MAX. Moreover, in this embodiment, if A is smaller than P in step 1703, control is passed to step 1708 and if A is equal to or greater than P, control is passed to step 1704. However, it is also possible to pass control to step 1708 if A is equal to or smaller than P and to step 1704 if A is greater than P.

In step 1602 of FIG. 16, if the value of the acquired item is "normal", the collection interval table 1220 (FIG. 2) is referenced and judgment is made whether the collection state of the item α2 is "detail" (1603). If the collection state is judged to be "detail", the abnormal item table 1250 (FIG. 6) is referenced to judge whether the item α2 has derivation (1609). If no derivation is present (as an abnormal item of the item α2, no item other than the item α2 itself is registered), notification 16 is issued to the collection interval management program 1260 (1611). This means that the item α2 is in the normal state and has no derivation. Accordingly, the collection interval of the derivative group associated with the item α2 is recovered to the initial value. The operation of the collection interval management program 1260 which has received the notification 16 is identical to the one shown in FIG. 9 referenced in the explanation of the first embodiment. The operation of the collection interval modification program 1112 performed in response to the notification of instruction of the collection interval management program is also identical to the one shown in FIG. 15 referenced in explanation of the first embodiment.

In step 1609, if it is judged that derivation is present, notification 17 is issued to the collection interval modification program 1112 (1610). The operation of the collection interval modification program 1112 which has received the notification 17 is identical to the case upon reception of notification 15 explained with reference to FIG. 17.

In step 1603, if the collection state of the item α2 is judged other than the "detail", the collection interval table 1220 (FIG. 2) is referenced to judge whether the collection state of α2 is "temporary stop" (1608). If the collection state is the "temporary stop", judgement is made whether derivation is present (1612). If no derivation is present, notification 16 is issued to the collection interval management program 1260 (1611). This is for recovering the collection interval of the derivative group associated with the item α2 to the initial value. The collection interval management program 1260 and the collection interval modification program 1112 which have received the notification 16 operate as has been explained above.

In step 1608, if the collection state is judged to be other than the temporary stop, judgment is made whether the collection state is "degeneration" (1613). If the collection state is judged to be "degeneration", notification 17 is issued to the collection interval modification program 1112. The collection interval modification program 1112 which has received the notification 17 operates in the same way as has been explained above (1614). However, since the collection state is currently "degeneration", the values used as the maximum value MAX and the minimum value MIN of the variation width of the collection interval are the values registered in the maximum value 260 and the initial value 220 of FIG. 2 as has been explained above.

In this embodiment also, the computer load monitoring program is used to monitor the items associated with the computer load. If any item value is abnormal, the item of the detail collection state is modified to the temporary stop while the collection interval of the item in the degeneration state or normal state can be increased. In this case, the computer load monitoring program operates in the same way as has been explained with reference to FIG. 15 in the first embodiment. The collection interval management program operates in the same way as has been explained with reference to FIG. 10 and FIG. 11 in the first embodiment. The collection interval modification program operates in the same way as has been explained with reference to FIG. 13 in the first embodiment. However, as the Y in step 1301 of FIG. 13, it is necessary to select a value not greater than the "maximum value" predetermined in FIG. 2 for the item whose collection item is to be increased.

As has been described above, according to the present invention, it is possible to collect detail information on the execution state of the program executed on a computer while suppressing the computer load.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A program execution state monitoring method using a computer for acquiring a plurality of item values associated with the program execution state at intervals linked to a plurality of items corresponding to the item values, and stored in a storage device, the method comprising the steps of:

comparing an item value of an item of the plurality of items to a condition linked to the item and stored in the storage device;

if the condition is not satisfied, decreasing an interval of an item belonging to a group linked to the compared item and stored in the storage device; and increasing an interval of at least one item not belonging to said group.

2. A program execution state monitoring method as claimed in claim 1, the method further comprising the steps of:

storing an initial value, first and second minimum values, and first and second maximum values of each of said intervals linked to the plurality of items while correlating the initial value, first and second minimum values, and first and second maximum values with respective items associated with the program execution state;

if the interval of one of the plurality of items for which a value is acquired is greater than said initial value, making the interval of the one item so as to be equal to or greater than said first minimum value and not greater than said first maximum value linked to the one item according to the value acquired; and if the interval of one of the plurality of items for which a value is acquired is smaller than said initial value, making the interval of the one item so as to be equal to or greater than said second minimum value and not greater than said second maximum value linked to the one item according to the value acquired.

3. A program execution state monitoring method as claimed in claim 1, the method further comprising the steps of:

storing in a storage device an initial value, first and second minimum values, first and second maximum values of each of the plurality of intervals, and a reference value for the variation ratio each of the intervals linked to respective items associated with the program execution state;

modifying said interval of said one item to be smaller than said interval and not smaller than said first minimum value related to said one item if an absolute value of a variation ratio of the value of said one item acquired is not smaller than said reference value linked to said one item and greater than said initial value stored in said storage device;

modifying said interval of said one item to be smaller than said interval and not smaller than said second minimum value related to said one item if an absolute value of a variation ratio of the value of said one item acquired is not smaller than said reference value linked to said one item and smaller than said initial value stored in said storage device;

modifying said interval of said one item to be greater than said interval and not greater than said first maximum value linked to said one item if an absolute value of a variation ratio of the value of said one item acquired is smaller than said reference value linked to said one item and greater than said initial value stored in said storage device; and modifying said interval of said one item to be greater than said interval and not greater than said second maximum value related to said one item if an absolute value of a variation ratio of the value of said one item acquired is smaller than said reference value linked to said one item and smaller than said initial value stored in said storage device.

4. A program execution state monitoring method using a computer for acquiring a plurality of item values associated with the program execution state at intervals linked to a plurality of items corresponding to the item values, and stored in a storage device, the method comprising the steps of:

comparing an item value of an item of the plurality of items to a condition stored in the storage device;

if the condition is not satisfied, decreasing an interval of each item linked to the compared item; and if the item value of an item associated with a computer load is different from the condition stored in the storage device, decreasing an interval of at least one of the plurality of items associated with the program execution state and having an interval not smaller than an initial value linked to the item and stored in the storage device.

5. A program execution state monitoring method as claimed in claim 4, the method further comprising the steps of:

storing in the storage device the initial value, first and second minimum values, first and second maximum values of the intervals, and a reference value for the variation ratio of each of the intervals which are linked to respective items associated with the program execution state;

modifying said interval of said one item to be smaller than said interval and not smaller than said first minimum value linked to said one item if an absolute value of a variation ratio of the value of said one item acquired is not smaller than said reference value linked to said one item and greater than said initial value stored in said storage device;

modifying said interval of said one item to be smaller than said interval and not smaller than said second minimum value linked to said one item if an absolute value of a variation ratio of the value of said one item acquired is not smaller than said reference value linked to said one item and smaller than said initial value stored in said storage device;

modifying said interval of said one item to be greater than said interval and not greater than said first maximum value linked to said one item if an absolute value of a variation ratio of the value of said one item acquired is smaller than said reference value linked to said one item and greater than said initial value stored in said storage device; and modifying said interval of said one item to be greater than said interval and not greater than said second maximum value linked to said one item if an absolute value of a variation ratio of the value of said one item acquired is smaller than said reference value linked to said one item and smaller than said initial value stored in said storage device.

6. A program execution state monitoring method using a computer for acquiring a plurality of item values associated with the program execution state at intervals linked to a plurality of items corresponding to the item values, and stored in a storage device, the method comprising the steps of:

comparing an item value of an item of the plurality of items to a condition stored in the storage device; and
   when the condition is not satisfied and an item value of an item associated with a computer load satisfies the condition and stored in the storage device, decreasing the interval of each of the plurality of items linked to the compared item.

7. A program execution state monitoring method as claimed in claim 6, wherein if the item value of the item associated with the computer load does not satisfy the condition stored in the storage device, an interval of at least one of the items associated with the program execution state and having a value not smaller than an initial value linked to the item and stored in the storage device is increased.

8. A program execution state monitoring method as claimed in claim 7, the method further comprising the steps of:

storing in the storage device the initial value, first and second minimum values, first and second maximum values of each of the plurality of intervals, and a reference value for the variation ratio of each of the intervals which are related to respective items associated with the program execution state;
   modifying said interval of said one item to be smaller than said interval and not smaller than said first minimum value related to said one item if an absolute value of a variation ratio of the value of said one item acquired is not smaller than said reference value related to said one item and greater than said initial value stored in said storage device;
   modifying said interval of said one item to be smaller than said interval and not smaller than said second minimum value related to said one item if an absolute value of a variation ratio of the value of said one item acquired is not smaller than said reference value related to said one item and smaller than said initial value stored in said storage device;
   modifying said interval of said one item to be greater than said interval and not greater than said first maximum value related to said one item if an absolute value of a variation ratio of the value of said one item acquired is smaller than said reference value related to said one item and greater than said initial value stored in said storage device; and
   modifying said interval of said one item to be greater than said interval and not greater than said second maximum value related to said one item if an absolute value of a variation ratio of the value of said one item acquired is smaller than said reference value related to said one item and smaller than said initial value stored in said storage device.

9. A program execution state monitoring method using a computer for acquiring a plurality of item values associated with the program execution state at intervals related to a plurality of items corresponding to the item values and stored in a storage device, the method comprising the steps of:

comparing an item value of an item of the plurality of items to a condition stored in the storage device; and
   when the condition is not satisfied and the number of items related to the compared item is equal to or smaller than a predetermined value, decreasing the interval of the respective items related to the compared item.

10. A program execution state monitoring method using a computer for acquiring a plurality of item values associated with the program execution state at intervals related to a plurality of items corresponding to the item values and stored in a storage device, the method comprising the steps of:

storing in the storage device a first group consisting of at least one of the plurality of item values;
   when one of the at least one of the plurality of item values does not satisfy a condition related to a respective first item of the plurality of items and stored in the storage devices, and when a second group related to a second item different from the first item and including items having intervals smaller than an initial value set for the intervals, changing the intervals of the respective items to the initial values; and
   decreasing the interval of each of the items belonging to the group related to the first item.

11. A program execution state monitoring method using a plurality of computers connected in such a manner that they can communicate with one another for acquiring a plurality of item values associated with execution states of a program executed on the computers at intervals related to a plurality of items corresponding to the item values and stored, the method comprising the steps of:

comparing an item value acquired for a first item of the plurality of items to a condition related to the first item and stored by one of the plurality of computers;
   if the item value does not satisfy the condition, extracting a second item related to the first item and stored in a storage device and at least one of a plurality of items not related to the first item by at least one of said one of the plurality of computers or another computer;
   modifying an interval related to the extracted second item related to the first item and stored in the storage device to an interval smaller than the interval stored by said one of said plurality of computers or another computer different from said one of said plurality of computers; and
   modifying an interval related to the extracted second item not related to the first item and stored in the storage device to an interval greater than the interval stored by said one of said plurality of computers or another computer different from said one of said plurality of computers.

* * * * *